(No Model.) 7 Sheets—Sheet 1.
I. H. TAYLOR.
CAN SOLDERING MACHINE.
No. 538,608. Patented Apr. 30, 1895.
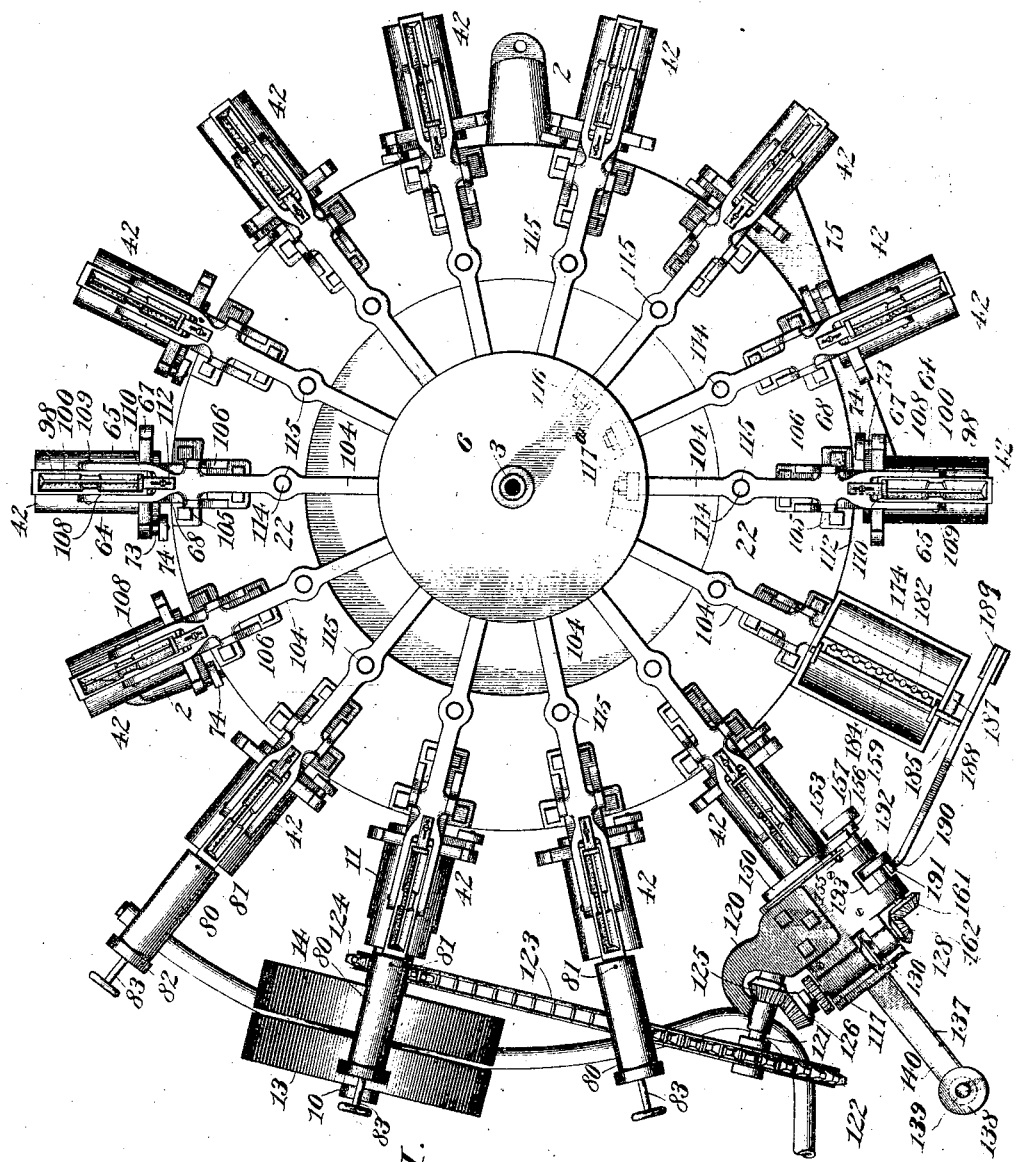
Fig. I.
Witnesses,
Inventor,
Isaiah H. Taylor.
By Joseph L. Atkins
Attorney (No Model.)  7 Sheets—Sheet 2.
I. H. TAYLOR.
CAN SOLDERING MACHINE.
No. 538,608.  Patented Apr. 30, 1895.
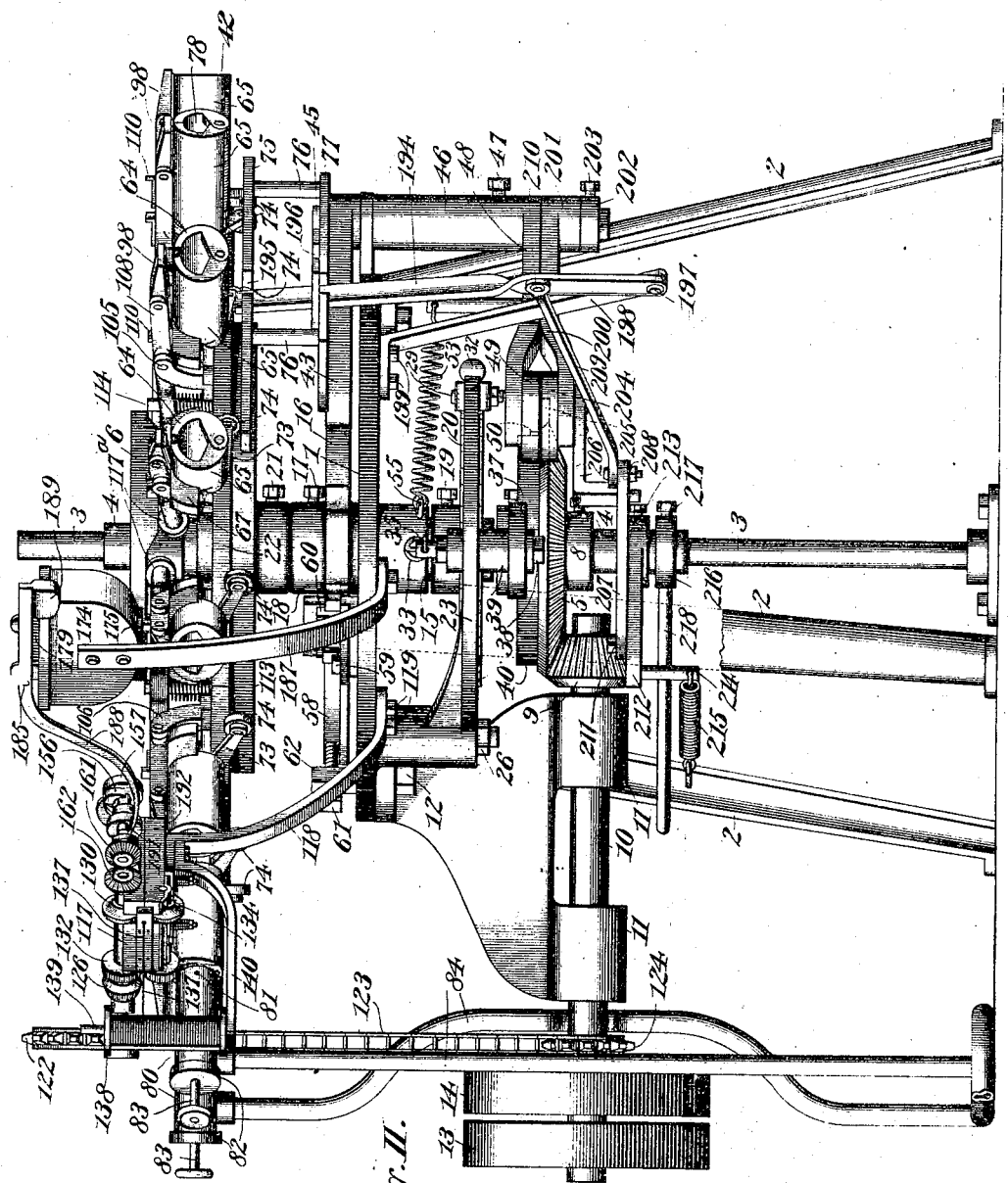
Fig. II.
Witnesses:
J. M. Witherow
M. E. Fowler
Inventor,
Isaiah H. Taylor,
By Joseph W. Atkins
Attorney

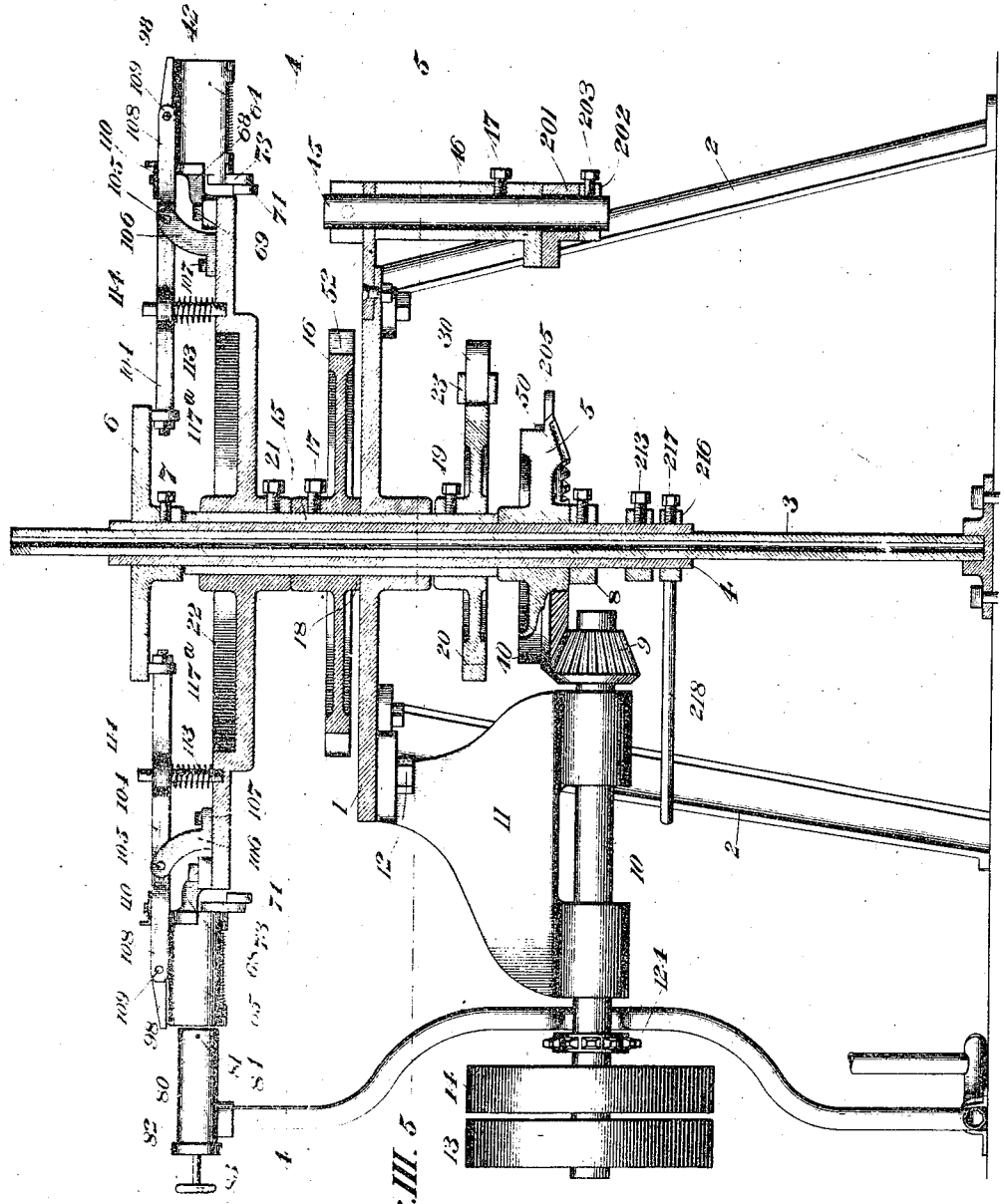

(No Model.) 7 Sheets—Sheet 4.
I. H. TAYLOR.
CAN SOLDERING MACHINE.
No. 538,608. Patented Apr. 30, 1895.
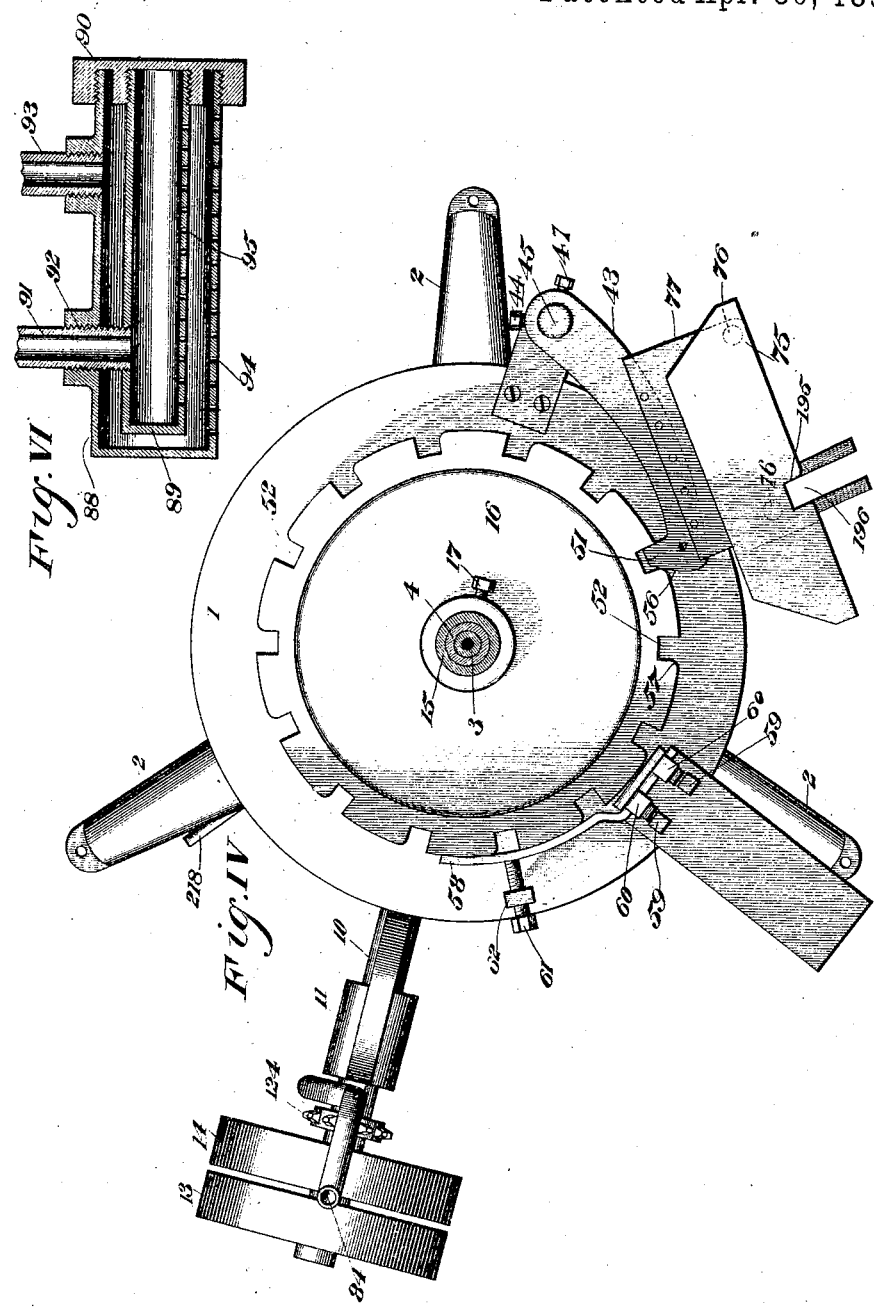
Witnesses:
J. M. Witherow
M. E. Fowler
Inventor,
Isaiah H. Taylor.
By Joseph L. Atkins
Attorney

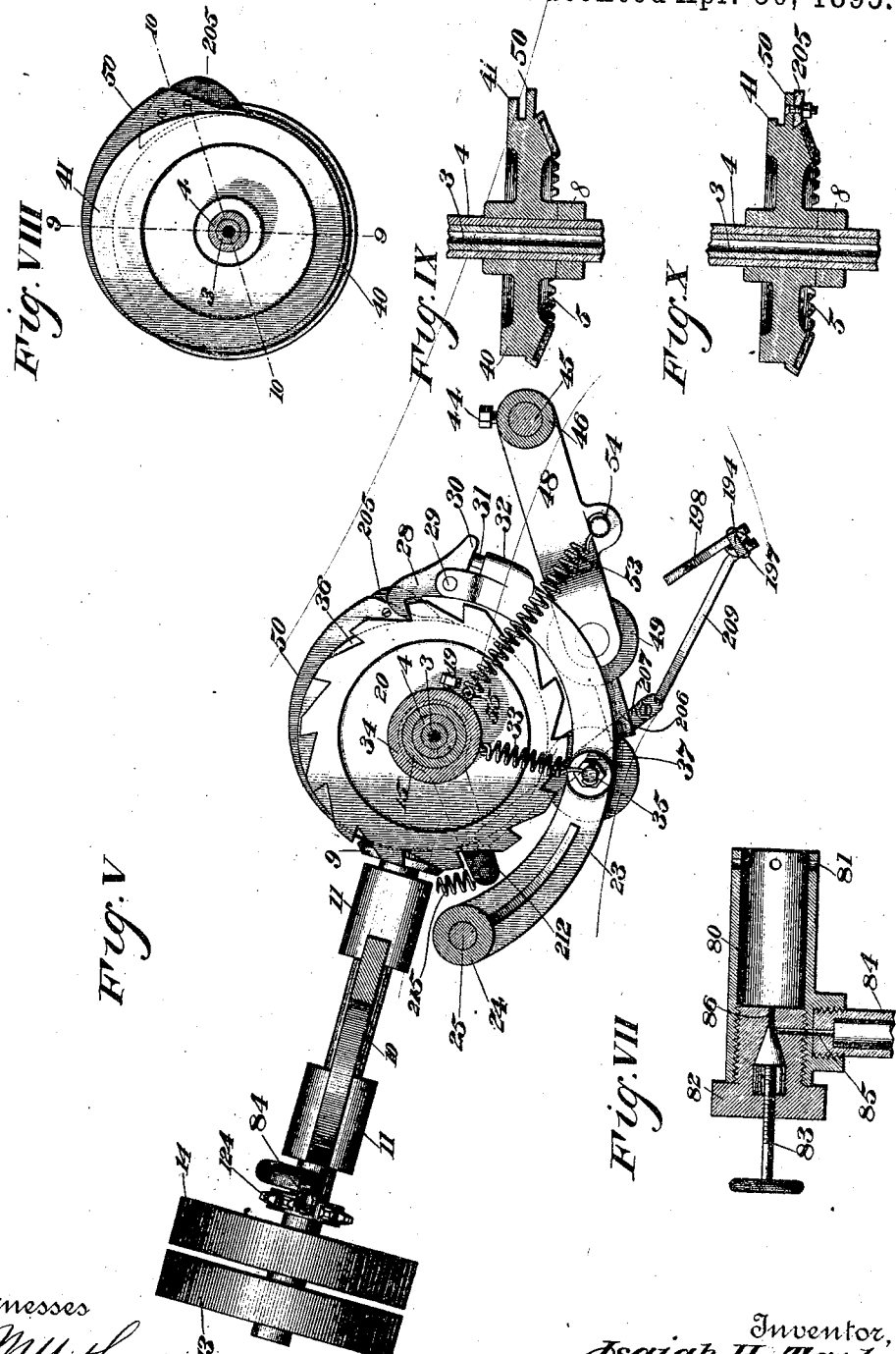

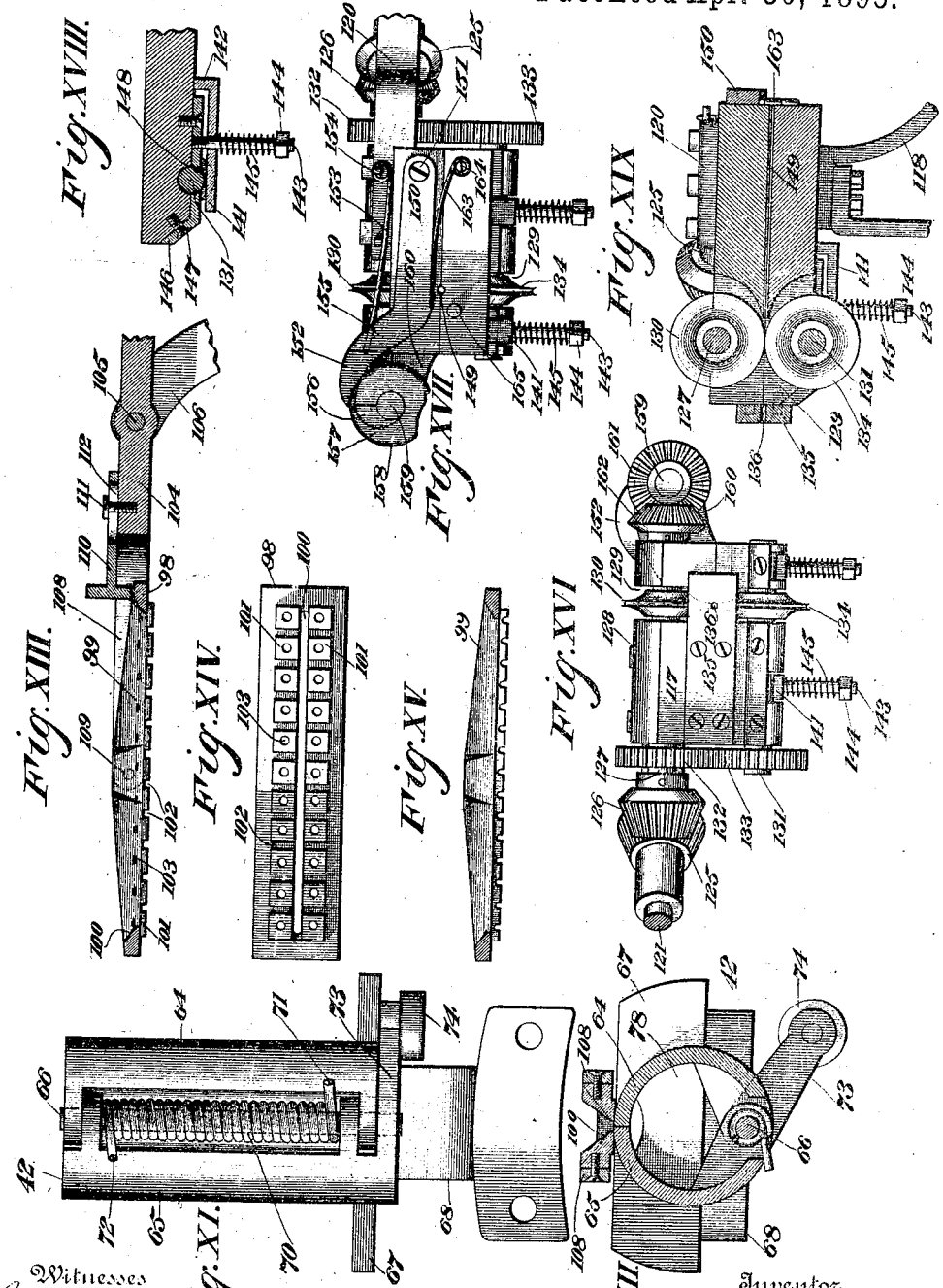

(No Model.)  7 Sheets—Sheet 7.
I. H. TAYLOR.
CAN SOLDERING MACHINE.
No. 538,608.  Patented Apr. 30, 1895.
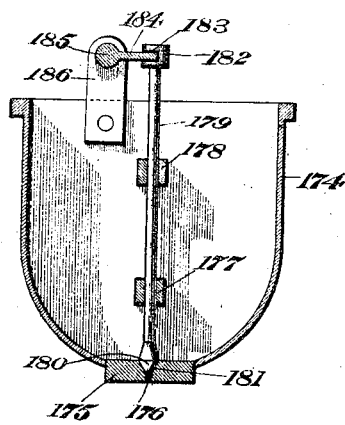
Fig. XX.
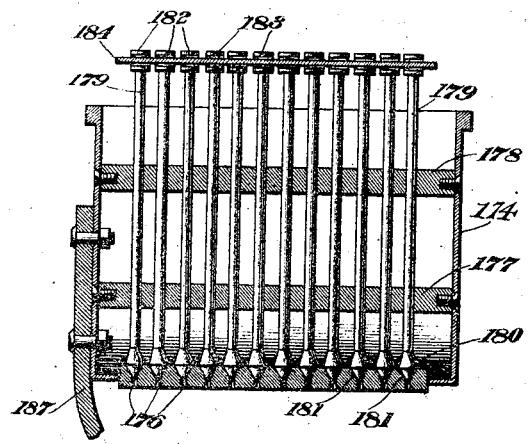
Fig. XXI.
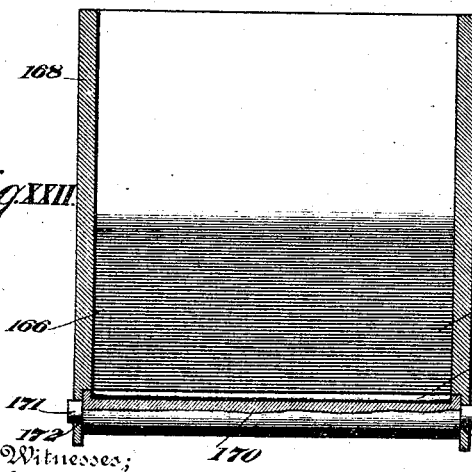
Fig. XXII.
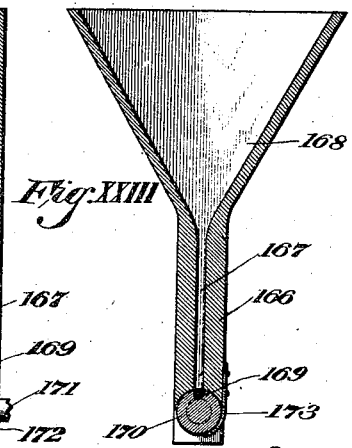
Fig. XXIII.
Witnesses:
Inventor,
Isaiah H. Taylor,
By Joseph D. Atkins
Attorney

UNITED STATES PATENT OFFICE.

ISAIAH H. TAYLOR, OF BALTIMORE, MARYLAND, ASSIGNOR, BY DIRECT AND MESNE ASSIGNMENTS, TO THE HUGHES-TAYLOR CAN COMPANY OF BALTIMORE CITY, OF SAME PLACE.

CAN-SOLDERING MACHINE.

SPECIFICATION forming part of Letters Patent No. 538,608, dated April 30, 1895.

Application filed May 28, 1894. Serial No. 512,718. (No model.)

*To all whom it may concern:*

Be it known that I, ISAIAH H. TAYLOR, of Baltimore, State of Maryland, have invented certain new and useful Improvements in Can-Soldering Machines, of which the following is a specification, reference being had to the accompanying drawings.

The object of my invention is to produce a machine designed for soldering the side seams of sheet metal cans by the direct application of a flame, in which the operation of the machine is so timed as to receive blanks to be soldered at proper intervals and to discharge the soldered blanks when completed.

My machine is especially adapted for the manufacture of that class of cans which are described in my Patent No. 483,660, issued October 4, 1892, and, in the main, is an improvement upon the subject matter of my Patent No. 516,980, dated March 20, 1894; but its use is not confined to the manufacture of the particular cans shown in the former patent and, in some respects, it involves a radical departure from the machine shown in the latter patent.

In the accompanying drawings, Figure I is a top plan view of my machine complete. Fig. II is a side elevation thereof. Fig. III is a central vertical section of my machine. Fig. IV is a section on the line 4 4 of Fig. III, the parts being shown in full. Fig. V is a similar section on the line 5 5 of Fig. III. Fig. VI is a central longitudinal section of a down-flame burner. Fig. VII is a similar view of an end-flame burner. Fig. VIII is a top plan view of the cam-wheel. Fig. IX is a section on the line 9 9 of Fig. VIII. Fig. X is a section on the line 10 10 of Fig. VIII. Fig. XI is a bottom plan view of the preferred form of gripper. Fig. XII is a section on the line 12 12 of Fig. XI. Fig. XIII is a longitudinal section of one of the solder-box arms and supports with the box in place. Fig. XIV is a bottom plan view of one of the solder-boxes. Fig. XV is a central longitudinal section of a modified form of solder-box. Fig. XVI is an outside end elevation of the solder-feeding mechanism. Fig. XVII is an inside view thereof. Fig. XVIII is a detail section showing the take-up mechanism of one of the solder-feed wheels. Fig. XIX is a longitudinal section of the solder-feeding mechanism, showing the arrangement of the feed-wheels. Fig. XX is a transverse section of the fluxer. Fig. XXI is a longitudinal section thereof. Fig. XXII is a longitudinal section of a modified form of solder-feeding mechanism, showing a solder-hopper and slit in connection with the longitudinally-grooved roller. Fig. XXIII is a cross-section thereof.

Referring to the figures on the drawings, 1 indicates a fixed table or bed plate that is supported as by legs 2, designed to be secured to a floor. 3 indicates a central vertical shaft which is preferably made hollow for the accommodation of down flame burners, such as are shown in my Patent No. 516,980, for example, but which, inasmuch as they are not involved in the present invention, are not illustrated as attached to the machine proper.

4 indicates a hollow shaft upon which loosely turns a beveled gear wheel 5 near its lower end and to which near its upper end is secured a cam disk 6. An abutment screw 7 serves to secure the cam disk to the shaft 4, and a collar 8 supports the gear 5 loosely thereon. Rotary motion is imparted to the gear 5 by means of a pinion 9 meshing therewith. The pinion is securely fixed to the end of a horizontal shaft 10 that is carried in a hanger 11 secured, as by bolts 12 to the bottom of the bed plate 1. Upon its outer end the shaft 10 carries a loose pulley 13 and a fixed pulley 14. Around the shaft 4 a hollow shaft 15 is revolubly carried. It is supported partially by the gear wheel 5 against which it abuts, and by a notched wheel 16 that is secured, as by an abutment screw 17, to it and which is supported, as by its collar 18, upon the surface of the bed plate 1. To the same shaft 15 below the bed plate is fixed, as by an abutment screw 19, a ratchet wheel 20 and above the notched wheel 16, as by a set screw 21, is secured to it a revolving circular table 22.

The driving power of the machine is supplied from the shaft 10 which, through the pinion 9, imparts a constant motion to the gear 5. The table 22 is intermittently driven from the same source of power; and the ratchet 20 and the notched wheel 16 are designed to convert the constant motion of the gear 5 into a regular step by step motion in the table 22. This object may be accomplished by the employment of a curved arm 23 provided with a sleeve 24 that may be made integral therewith, the sleeve acting as a broad bearing for the arm around a vertical stud 25 depending from the bottom of the bed plate.

A nut 26 serves to support the sleeve upon the stud.

The arm 23 carries upon its free end a pawl 28 pivoted, as indicated at 29, to the arm and having a tail piece 30 that engages with and is actuated by a spring-driven plunger 31, working in a socket 32, in the periphery of the arm. A spring 33 secured at one end to a collar 34, depending from the bed plate 1, and at the other end to a stud pin 35 upon the arm 23 tends to keep the pawl 28 in engagement with the notch 36 of the ratchet wheel 20. Under the actuation of the spring 33, the arm 23 would be drawn into contact with the periphery of the ratchet wheel, except that it is supported upon a roller 37 rotatably secured, as by a nut 38, to the reduced end of a stud bolt 39, depending from the bottom of the arm 23. The roller 37 rides upon a boss 40 of the gear 5. The boss swells eccentrically into a cam 41. (See Figs. VIII, IX and X.) There are three cams upon the boss, of which the cam 41 is the uppermost.

When, in the revolution of the gear 5, the cam 41 strikes the roller 37, it swings the arm 23 upon its pivot 25, and imparts a predetermined degree of rotation to the ratchet wheel 20. The arm 23, under the action of the spring 33 following in its motion the curvature of the cam, and having advanced the ratchet 20 a distance of one notch, slips its pawl 28 into engagement with the next notch, and is ready to repeat its operation of advancing the ratchet wheel with the next rotation of the cam 41. The table 22 is provided around its periphery with a series of can grippers 42. The number of grippers employed and the consequent capacity of the machine is determinable by the diameter of the table, but is equal in number to the number of ratchets 36 on the ratchet wheel 20. When, therefore, the arm 23, by its pawl 28, rotates the ratchet 20 the distance of a ratchet tooth, it imparts a similar degree of rotation to the table and advances each gripper one step. This may be clearly understood by reference to Fig. III of the drawings, in which the connection of the ratchet wheel and the table to the shaft 15 is clearly shown. It is not sufficient, however, that the table should be advanced step by step, but it is necessary to exactly define the degree of rotation imparted each time to the table, and thereby locate with each operation the exact position of each gripper. To accomplish this purpose, I employ detaining and releasing mechanism which preferably consists, in combination with the notched wheel 16, of a dog 43 that is fixed, as by a screw bolt 44, to a vertical shaft 45. The shaft 45 is surrounded by a sleeve 46 secured to the shaft, as by an abutment screw 47, so as to move with it. An arm 48 that may be made integrally with the sleeve 46, projects toward the boss 40 of the gear wheel 5 and carries, near its extremity, an anti-friction roller 49. This roller is of such thickness and is so located, with respect to the boss, that it escapes engagement with the cam 41 on the boss, but is actuated by a middle cam 50 also carried on the boss. (Compare Figs. VIII, IX and X with Fig. II.) The cam 50 should be located with respect to the cam 41 so as to actuate the arm 48 a little in advance of the actuation of the arm 23, whereof the reason becomes apparent, by reference to Fig. IV, in which it appears that the nib 51 of the dog 43 engages with a notch 52 of the notched wheel 16 and that before the wheel 16 can move the dog must release it by the actuation of the cam 50, in the manner above described. The dog is held normally in engagement with a notch of the wheel 16, as by a spring 53 secured at one end to a stud pin 54, on the arm 48 and at the other end to an eyelet 55 on the collar 34. In order to insure the engagement of the nib 51 of the dog successively with the notches 52, I provide on the outer edge of the dog a curved surface 56 and a curved corner 57 in each notch, so that as the tapered nib approaches the notch it enters it with certainty and, under the actuation of the spring 53, wedges itself into the notch and holds the wheel 16 rigidly fixed.

To insure even greater rigidity of movement, a metallic brake strap 58 secured, as by screws 59, to uprights 60 and actuated by a screw 61 screwing into a lug 62 that projects from the bed plate, may be employed. The grippers 42 are designed specially to grip the inturned edges of a can so as to expose an unobstructed surface to be soldered, but my invention is not confined exclusively to that form of gripper, the machine being adapted to actuate different forms and varieties of grippers. The form which is preferred, however, consists of two semi-cylindrical parts 64 and 65 hinged to a fixed shaft 66 that is rigidly secured to an end plate 67 which is supported by a bracket arm 68 secured, as by bolts 69, to the table 22. The two parts are kept normally closed by a spring 70 (see Fig. XI) coiled around the shaft 66 and having projecting ends 71 and 72 which bear against the edges of the gripper halves and keep them turned toward each other upon the shaft 66. The half 65 is provided with a trip arm 73 that carries upon its end an anti-friction roller 74. The antifriction roller is designed to automatically open the gripper by the rotation of the table 22. This object is accomplished by providing a tripping table 75 carried by the studs 76 secured to a supporting plate 77 that is bolted to the dog 43. The manner in which the tripping table operates to open the grippers is clearly shown in Fig. II of the drawings. It is while the trip arm 73 is lifted by the tripping table 75 that the soldered cans may be removed successively and new blanks fed into place.

The manner of operation of the grippers and the construction thereof are similar to the corresponding features shown in my Patent No. 516,980, the distinguishing feature being, however, that the grippers are provided with an open longitudinal bore or heating chamber 78 into which a flame may be projected for melting the solder between the seam defined in the blank by the clamping edges of the grippers. For this purpose I prefer to provide end flame burners, as illustrated in combination in Figs. I, II, III of the drawings and in detail in Fig. VII thereof. These may respectively consist of a combustion chamber 80 provided with air supply ports 81 and adapted to discharge its flame endwise from the combustion chamber. A plug 82 closes and defines one end of the combustion chamber and within that a needle valve 83 of ordinary construction may be employed.

84 indicates fuel supply pipes which communicate through ducts 85 and 86 with the combustion chamber. The end flame burners are preferably three in number and are located so as to discharge directly into the ends of the grippers successively, as soon as they are supplied with the flux and solder. A plurality of burners is employed in order to thoroughly heat the grippers and cause the solder to flow into the seam of the blank confined thereby.

While it is practicable to employ the special form of grippers above described in combination with end flame burners yet I have also devised practical means of using a down flame burner designed where employed, to be located similarly to the end flame burners illustrated, but discharging from above a flame downwardly against the top of the can blanks contained in the grippers.

In Fig. VI of the drawings a suitable down flame burner is illustrated, and inasmuch as the down flame burners are clearly shown in my Patent No. 516,980 and as they are merely intended to supply the place of end flame burners, it is thought that the detailed illustration shown in that figure is sufficient for the purposes of this description. In that figure a gas cylinder 88 closed at both ends, as illustrated, and an air cylinder 89, also closed at both ends, both cylinders being closed and united at one end, as by a union cap 90, are employed. An air pipe 91 passing through an air tight joint 92 in the gas cylinder communicates with the interior of the air cylinder and a gas pipe 93 communicates with the interior of the gas cylinder. In the lower walls of the gas cylinder and air cylinder, respectively, a line of perforations 94 and 95 are located, preferably opposite to each other. The line of perforations in the gas cylinder should be co-extensive in length with the seam of the blank that is held by the gripper to be thereby adapted to discharge a flame directly against the entire length of the seam to be soldered.

Great practical difficulty in can manufacture has been heretofore experienced in causing solder melted by a flame to flow into and fill the joint to be soldered. By my invention I have entirely overcome this difficulty by making provision for the passage of all the flame through the box which holds the solder, so as to entirely envelop the solder and to serve to heat all the parts, including the can seam itself, by the direct action of the flame.

Referring to Figs. XIII and XIV for the details of construction, 98 indicates a solder box which is preferably provided upon its upper side with a trough-shaped recess 99 designed to discharge through a longitudinal slit 100 in the bottom of the box. This slit should be co-extensive with the length of the can seam to be soldered and is bounded longitudinally upon opposite sides by ribs 101 extending from the bottom of the box. The ribs are separated by equi-distant grooves 102 and each segment thereof is also pierced by an aperture 103 extending into the interior of the box. The apertures 103 may, however, be omitted, as shown in Fig. XV of the drawings.

In practice a strip of solder wire of suitable length is dropped mechanically, or otherwise, into the trough 99. The downwardly directed flame completely fills the trough and envelops the solder, its passage through the slit 100, the grooves 102 and the apertures 103 (if they are employed) thereby at the same time sufficiently heating the box and the seam to be joined. By this means the solder is flowed into the seam upon a hot surface and a smooth joint is produced. It is necessary to make the box of a material which will not tin and I have found aluminum to be especially adapted for this purpose.

In order to bring the flame as it passes through the box into close contact with the seam to be soldered it is necessary that while the solder is being melted the bottom of the box should lie against the seam to be soldered, but it is also desirable that the contact between the box and the seam should only exist while the solder is being melted. On this account I employ a box carrier 104, pivotally supported as indicated at 105 upon a bracket arm 106 secured to the table, as by a screw bolt 107. The carrier is bifurcated, as indicated at 108, at one end, and carries between its legs as upon pivots 109, the box. By reason of its pivotal union with the carrier, the box, when the carrier is turned upon its pivot 105 toward the gripper, lies flat against the surface thereof, notwithstanding any inequalities that may exist in the surface of the can blank held between the grippers. A stop plate 110 pivotally secured, as by a screw 111 passing through a slot 112 therein into the carrier, may prevent the tilting of the box. A spring 113 coiled around a stud pin 114, screwed into the table 22 and passing through an aperture 115 in the carrier, may serve to normally urge the box toward the gripper. The time at which the box should be separated from the gripper coincides with that at which the grippers should be open for the displacement of the soldered can and the feeding of the blanks. For that purpose, upon the under side of the disk 6 opposite the tripping bridge 75, I provide a cam surface 116, clearly indicated in dotted lines in Fig. I of the drawings. Each box carrier is preferably provided upon its inner end with an anti-friction roller 117ª designed to ride against the cam surface 116.

I prefer to provide mechanical means for feeding the solder in suitable lengths to the solder box and for this purpose may employ solder feeding and cutting mechanism, as is clearly shown in combination in Figs. I and II and in detail in Figs. XVI, XVII, XVIII and XIX, in which—

117 indicates the body of my cutter and feeder supported as upon an arm 118 secured, as by bolts 119, to the bottom of the bed plate 1. It carries, in suitable bearings, in a side arm 120, a shaft 121 which has a continuous motion and to which is secured a sprocket wheel 122 that is geared, as by a chain 123, to a sprocket wheel 124 secured to the constantly revolving shaft 10. To the shaft 121 a beveled gear 125 is fastened that gears with a beveled gear 126 that is fastened to a feed driving shaft 127 carried in suitable bearings 128 in the body of the cutter and feeder. Within a recess 129 a grooved feed roller 130 revolves, the feed roller being secured to the shaft 127.

131 indicates a lower feed shaft which is geared to the shaft 127 as by gear wheels 132, and 133. To the shaft 131, within the recess 129, a lower grooved feed roller 134 is secured. 135 indicates a guide plate and 136 an aperture opposite the juncture of the grooves in the rollers 130 and 134. The aperture 136 is designed to evenly feed a continuous strand of wire solder 137 from a spool or bobbin 138 carried upon a pin 139 that projects upwardly from an arm 140 extending from the bottom of the body 117. To keep the grooved rollers in proper feeding relation to each other, I provide suitable tension regulating mechanism which may consist of a movable block 141 which supports the shaft 131 within the bearings in the body 117. A tail piece 142 bent at right angles to the plate 141 prevents the plate from turning. A pin 143 (see Fig. XVIII) and a nut 144 on the end thereof yieldingly sustains, by the aid of a coiled spring 145, the plate in position.

The adjustment of the nut upon the pin serves to regulate the tension of the spring and the upward pressure of the plate 141 against the shaft 131. A bearing plate 146 secured as by screws 147 to the bottom of the body 117 may serve to afford a more complete bearing 148 for the shaft 131.

149 indicates a discharge orifice through which the wire 137 is fed toward the gripper above the solder box 98, the orifice being so located that each gripper will come to a stop successively in front of it while the machine is in operation. When a sufficient quantity of wire has been fed out through the orifice 149, a properly timed cutter severs it and drops it into the solder box beneath. For this purpose I provide a knife 150, having a broad rectangular edge, pivoted to the body as by a screw 151 and terminating in a curved end 152 which, by a spring 153 secured to the body part, as by a screw 154 at one end, and bearing at the other end against a pin 155 is held in contact with the cam 156 of a wheel 157 the wheel being preferably provided with an outer guide rim 158. The wheel 157 is secured to a shaft 159 carried in suitable bearings in a bracket 160 on one side of the body 117. The shaft is driven by a beveled gear 161 which meshes with a gear 162 that is secured to the shaft 127. The force of the spring 153, although sufficient to keep the end 152 of the knife in engagement with the cam 156, is counter-acted by a spring 163 secured to the face of the body 117, as by a screw 164, and bearing against the broad rectangular bottom of the knife. The spring 163 serves to cushion the knife and diminish the force with which it strikes the limiting pin 165. The wheel 157 is timed so as to sever the solder in proper lengths.

Although the cutting and feeding mechanism just described is found, in practice, to be amply sufficient for the purpose, yet, if preferred, the modified form of feeder shown in Figs. XXII and XXIII may be employed. In these figures 166 indicates a dropper having a feed slit 167 of a required length to hold the lengths of solder necessary and of a width to easily admit the passage of strips of solder. The slit 167 diverges at its upper end into a hopper 168 into which the lengths of solder may be fed either mechanically or manually. The lower end of the slit is coincident with a longitudinal groove 169 in the periphery of a feed roller 170. The feed roller is carried upon journals 171 in bearings 172 in the dropper and is designed to be rotated by suitable mechanism (not illustrated). Each time the roller makes a complete revolution it slips a piece of solder and drops it into the solder box above which, in practice, the dropper is located. A brake plate 173 may be used for rendering the movement of the roller steady and regular.

My preferred form of fluxing mechanism consists of a reservoir 174 provided with a bottom plate 175 within which is longitudinally arranged a row of perforations 176 substantially co-extensive in length with the seam to be soldered.

177 indicates bearing plates within apertures 178 in which are longitudinally movable feed rods 179, one rod being provided for each of the apertures 178. The feed rods are preferably provided with conical tips 180 which fit into the inversely conical sockets 181 in the bottom plate 175. The sockets coincide with the apertures 176 into which, in effect, their sides converge. By raising and lowering the feed rods 179 a liquid flux contained in the reservoir 174 may be deposited through the apertures 176 upon the seam to be soldered. It is designed that the rods should feed simultaneously and for this purpose I may provide heads 182 on each of the rods and notches 183 in their sides. In each of these notches a flange or web 184 on a rock shaft 185 works. The rock shaft is carried in suitable bearings in standards 186 secured to the ends of the reservoir and by its movement is adapted to simultaneously raise and lower the feed rods and thereby produce the feeding operation of the flux. The reservoir 174 may be supported upon a bracket arm 187 that is bolted to the bottom of the bed plate 1 and with this arrangement the end of the rock shaft may be provided with a trip lever 188, counter-weighted at 189 so as to keep the feed rods normally closed. The opposite end of the rod is curved slightly, as indicated at 190 and projects in the path of an eccentric pin 191 carried on a wheel 192 that is secured to the shaft 159 within a recess 193. By this arrangement, with each revolution of the wheel 192, the pin 191 imparts a slight movement to the trip lever 188 sufficient to actuate the rock shaft 185 and thereby raise the feed rods 179 for the emission of a modicum of flux.

In addition to the mechanism above described for producing a can seam, I prefer to employ mechanical automatic can discharging mechanism. For this purpose, I employ a kicker 194 which is designed to automatically throw off a completed can when the gripper is open upon reaching the tripping table 75. This kicker may have access behind the can through recesses 195 and 196 in the tripping table and supporting plate 77, respectively, and is preferably pivoted, as indicated at 197, to a pendent arm 198 secured, as by bolts 199, to the bottom of the bed plate 1. The kicker actuating mechanism timed to discharge cans at proper intervals, may consist of a kicker trip arm 200 loosely pivoted, as by a collar 201, to the end of the shaft 45, upon which it is supported, as by a set collar 202, secured by an abutment screw 203, to the shaft. The kicker trip arm carries upon its free end an anti-friction roller 204 that is urged toward the boss 40 and is actuated at regular intervals by the cam 205 which is the lowest one upon that boss. It may be observed that the roller 204 is located just beneath the roller 49 so as to escape actuation by any but its proper cam. The kicker trip arm carries also upon its free end an angular trip bar 206 which moves with a connecting arm 207 pivoted, as indicated at 208, to a pitman 209, that is pivoted in turn at 210 to the kicker. At 211 the connecting arm is pivoted to a supporting arm 212 that is fixed by a set screw 213 to the shaft 4. The supporting arm 212 carries a pendent stud 214 on its outer end to which, at one end, a spring 215 is secured and is secured at the other end to one of the legs 2 that support the bed plate 1. The action of the spring 215 tends to hold the kicker normally within the recesses 195 and 196, and likewise, by engagement of the connecting arm 207 with the trip bar 206, to hold the roller 204 in engagement with the boss 40.

A collar 216 secured to the shaft 4 by a set screw 217 carries a rod 218 which strikes at its free end against the leg 2 and affords a stop piece to limit the movement of the stud 214 under the actuation of the spring 215.

What I claim is—

1. In a can seaming machine, the combination with a table or frame, driving mechanism, and heating mechanism, of can conveying mechanism, including horizontal grippers adapted to grip and expose the side seams of a can, solder cutting and feeding mechanism connected with the driving mechanism and timed to operate immediately before the cans are subjected by the conveying mechanism, to the action of the heating mechanism, substantially as specified.

2. In a can seaming machine, the combination with a table or frame, driving mechanism, and step by step moving can blank conveying mechanism, of grippers on the can blank conveying mechanism adapted to carry the can blanks, heating chambers within the grippers and stationary end flame burners adapted to discharge a flame into the heating chambers of the grippers, substantially as specified.

3. In a can seaming machine, the combination with a table or frame, can conveying mechanism, heaters and driving mechanism, of grippers included in the can conveying mechanism, gripper actuating mechanism, solder boxes above the grippers, and mechanism adapted to raise each solder box simultaneously with the operation of the gripper actuating mechanism, substantially as set forth.

4. In a can seaming machine, the combination with a table or frame, driving mechanism including a wheel and cams thereon, of can conveying mechanism, intermittently actuated driving mechanism for operating the can conveying mechanism, detaining and releasing mechanism and can discharging mechanism, all driven by the several cams of the wheel, substantially as set forth.

5. In a can seaming machine, the combination with a table or frame, movable table, grippers and driving mechanism, of solder boxes for each gripper, respectively pivotally supported solder box carriers, and a cam disk adapted to actuate the solder box carriers, substantially as and for the purpose specified.

6. In a can seaming machine, the combination with a table or frame, revolving table, grippers and driving mechanism, of solder boxes, pivotally supported carriers yieldingly holding the solder boxes in direct contact with the grippers, and a cam disk adapted to operate the solder box carriers, substantially as and for the purpose specified.

7. As a part of a soldering machine, a solder melting box provided with a slit extending entirely through its wall, and ribs on the bottom of the box on each side of the slit, substantially as specified.

8. As a part of a soldering machine, a solder box, a slit therein, ribs on the bottom thereof on each side of the slit, and transverse grooves in the ribs, substantially as set forth.

9. As a part of a soldering machine, the combination with a solder box, slit therein, ribs on the bottom of the box on each side of the slit, and grooves and apertures in the ribs, substantially as set forth.

10. As a part of a soldering machine, a solder box provided on one side with a trough, a slit therein, and ribs on the bottom of the box on each side of the slit, provided with air inlets, substantially as set forth.

11. As a part of a can soldering machine, the combination with a can blank retaining device, of a solder box carrier and a solder box pivotally supported therein above the can retaining device, substantially as set forth.

12. As a part of a can soldering machine, solder feeding mechanism consisting of a body part, driving mechanism, grooved feed rollers, and mechanism for regulating the tension of the feed rollers, substantially as set forth.

13. In can soldering machine solder feed mechanism, the combination with driving mechanism, shafts and grooved rollers, of spring supporting mechanism bearing against one of the shafts adapted to regulate the tension between the rollers, substantially as set forth.

14. In can soldering machine solder feed mechanism, the combination with driving mechanism and feed rollers, of a dropper and slit therein, and a longitudinally grooved roller in the end of the dropper under the slit and connected with the driving mechanism, substantially as and for the purpose specified.

15. In a can seaming machine, the combination with a frame, and means for holding a can blank thereon, heating chambers therein, of end flame burners located outside of but in alignment with the heating chambers and adapted to discharge a flame into the same, substantially as set forth.

In testimony of all which I have hereunto subscribed my name.

ISAIAH H. TAYLOR.

Witnesses:
F. D. BLACKISTONE,
LOUIS G. JULIHU.